June 10, 1924.　　　　　　　　　　　　　　　　1,497,549
H. CONRADI
STRUCTURAL JOINT
Filed March 6, 1922

Inventor
Harry Conradi
by Wilkinson & Huxta
Attorneys.

Patented June 10, 1924.

1,497,549

UNITED STATES PATENT OFFICE.

HARRY CONRADI, OF TOORAK, VICTORIA, AUSTRALIA.

STRUCTURAL JOINT.

Application filed March 6, 1922. Serial No. 541,538.

*To all whom it may concern:*

Be it known that I, HARRY CONRADI, a subject of the King of Great Britain and Ireland, residing at 1ª Woodside Crescent, Toorak, in the State of Victoria, Commonwealth of Australia, have invented certain new and useful Improvements in Structural Joints; and I do hereby declare the following to be a full, clear, and exact description of the invention, such as will enable others skilled in the art to which it appertains to make and use the same.

My invention relates to making concrete pipe and like joints to withstand high internal fluid pressure, and is also applicable where the joints will be subjected to other severe stresses, and where the working spaces available for closing the joints are restricted. My construction is hereinafter explained by reference to the accompanying drawings.

In the drawings Figure 1 shows an end elevation of one form of an outer clamp or band.

Figure 1:
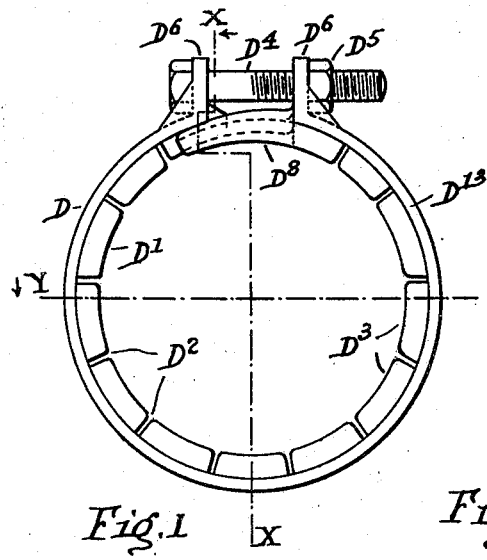
Figure 3:
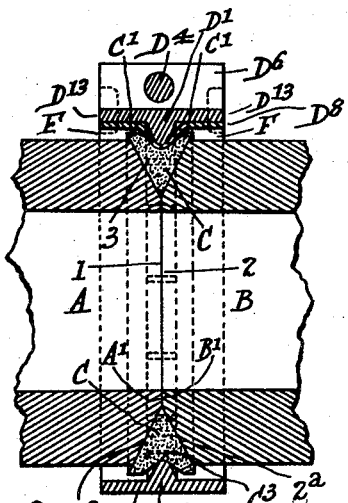
Figure 3 is an elevation in vertical section on line X—X through Figure 1, and also shows pipe ends butted together and fitted with my jointing ring.
Figure 2:
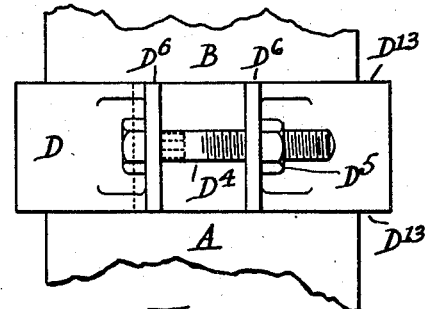
Figure 2 is an external view of pipe ends jointed by the said clamp, and other parts.
Figure 4:
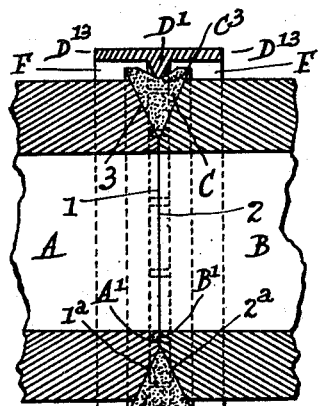
Figure 4 is a sectional plan on line Y of Figure 1, and also shows pipe ends butted together and fitted with my jointing ring.

The parts in Figures 3 and 4 are drawn in positions they have before tightening the outer band; when tightened the latter contacts with and presses a larger surface of the ring. Metal used in carrying this invention into effect is to be protected from rusting by galvanizing or otherwise suitably treating.

In the drawings, A and B are pipes having ends 1, 2, which meet, and are pressed together to form a butt joint. I form the meeting ends of pipes to be joined, in part conical so that, when the ends are butted together, each pair of meeting ends forms, in combination, a wide mouthed circular channel or groove 3 which narrows inwardly.

The greater part 1ª, 2ª of each pipe end is inclined at any suitable angle to the pipe axis, and each pipe end has an annular surface, $A^1$, $B^1$, to enable the butt joint to be made. Instead of plane inclined surfaces 1ª, 2ª, angular, corrugated, curved, or like modified surfaces are usable, provided the combination of surfaces forms the said circular channel or groove with its base narrow or pointed in cross section. This groove is intended to be filled by a compressible resilient jointing ring C—for which rubber is suitable—as it is impermeable.

Ring C is to be powerfully pressed inwardly, to enable heavy outward pressure of fluid from the pipe interior to be resisted. It is of various forms in practice and is shown V shaped to fit the groove 3. The extent to which it projects out of the groove is variable.

I apply the pressure to the ring (by means of an outer clamp or band) in the direction of the pipe axis, filling the groove, and pressing the ring edges on the pipes, outside of but near the groove mouth.

These edges under pressure, act effectively as flanges. The outer band or clamp has lugs or ends to be drawn towards one another, means of so drawing band lugs being well known. I do not however claim it to be new to use resilient rings not compressed directly inwardly into grooves of the aforesaid kind, or rings combined with relatively expensive additional features which I find unnecessary, nor do I claim novelty individually for any pipe end recess, resilient ring, or clamp.

When pipes to be butted together and jointed are not thick or strong enough to be grooved to receive a jointing ring as aforesaid, I thicken their ends, but as thickening of pipe ends presents no difficulty I make no further reference thereto.

In laying pipes, deformity and imperfect laying occurs in practice in regard to the pipe alignment, initially and/or subsequently; in some cases it is also decided to lay a pipe line which deflects slightly from rectilineal. Thus some of the butt jointing will be imperfect as some pipes will be out of alignment in one or more planes. But my resilient jointing ring will still prove effective owing to its considerable power of varying its form and bulk. This ring, where it enters the groove, is V shaped or approximately so in cross section. It is made with outer overhangs or flanges at C¹, which project beyond the groove, and overhang pipes outside the groove. Its inner periphery is narrow, or pointed in cross section. This ring may if desired be built from connected sections. Its sides normally meet or nearly meet the tapering groove sides 1ª, 2ª, prior to the application of pressure on the ring, and prevent leakage when the ring is compressed, its shape being then regulated by the surfaces with which it contacts.

D is a clamp, or ring pressure means, under which (in the ring outer periphery) is a recess C³, the clamp having interior projecting means, marked as a whole D¹, to enter recess C³.

The said projecting means is shown tapering inwardly, and channelled at D², forming projections D³, the number of which may vary to facilitate clamp tightening, and compression of ring C, which becomes according to the clamp pressure, more or less indented in the plane of the butt joint.

Figure 5:
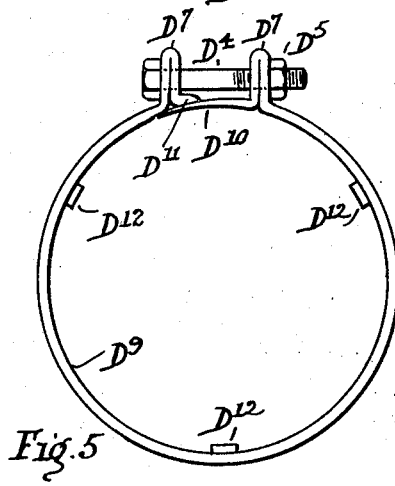
Figure 5 shows a modification of Figure 1.
Figure 7:
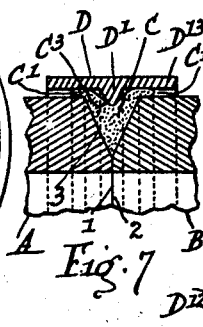
Figure 7 is a sectional view exhibiting compression of a jointing (herein also referred to as a resilient or rubber) ring in the direction of the pipe axis.
Figure 6:
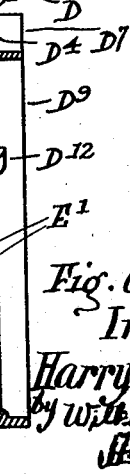
Figure 6 shows a sectional elevation through an outer band having modified means for compressing the jointing rings.

The clamp D is shown with lugs D⁶, bolt D⁴ and nut D⁵; in Figure 5 there are lugs D⁷, and a bolt and nut, but the number of bolts and nuts used may vary. In Figures 6 and 7, D⁹ is a band with an end D¹⁰ tapered and covered by an opposite end D¹¹. The lugs D⁷ are shown integral.

This band has means (shown as recessed lugs D¹²) to hold under it a pressure ring E of any suitable cross section (as a substitute for projections D³). Ring E has overlapped tapered ends E¹ and enters recess 3, in which it contracts when the band is tightened.

A useful jointing effect is securable with a rubber jointing ring having no outer peripheral recess, the clamp still causing inner projections D³ or ring E to indent the resilient jointing ring.

Clamp sides D¹³ extend outward of the projecting means D¹ and cover the whole of the resilient ring and enclose parts of the pipe ends.

Hoop bolts tightened by nuts are well known, and are—as a modification—usable as clamps.

I provide means to bridge gaps between clamp lugs; as a tongue D⁸ having its end lapping under rib D¹; or I insert a separate bridging plate locating its ends beneath the clamp ends.

I introduce at will cement or other packing on the pipe ends under clamp sides D¹³ at F, so that the clamp will when tightened compress this packing, strengthen the joint, and protect the rubber jointing ring. When the clamp is tightened space F will be narrowed and the overhangs or flanges C¹ of ring C will be compressed upon the pipes. This compression helps to resist longitudinal separation of the pipes.

To produce my joint the pipes must first be laid suitably, and accordingly I lay them in, for example, a graded trench, each pipe being forced or held firmly against the preceding one, and (to prevent movement of the pipes) I pack earth around each, but leave, in the first instance, working space at each butt joint, to allow of closing it leak proof. When a length of pipes (which must not be too short, or the pipes could move) say equalling or exceeding one chain, has been packed as aforesaid, various of the pipes will be unable to move (or move seriously) out of place during the fairly heavy stresses occasioned during the completion of the jointing. There will be considerable pressure in a longitudinal direction tending to separate pipes where they butt together. Such tendency must not succeed, except in so far as slight separation is found to have no objectionable results. Pipes to be jointed together may be provided if desired with metal attachments to be positively connected and drawn together in the direction of the pipe line, so that the pipes cannot be forced farther apart; but in regard to such attachments various forms are known and I find it is (so far as a vast amount of pipe jointing is concerned) advantageous to do without them, and thus reduce costs considerably.

The clamps may be provided with inwardly extending flanges or projections (not illustrated) clear of the sides of the jointing ring by which to protect the latter, these flanges extending close to the pipe circumferences. I show clamps which are circular, but obviously each could be in a series of parts, and be, for example, semi-circular.

I claim:—

A joint of the character described comprising pipe ends having inner portions adapted to abut but formed with divergent outer walls providing a substantially V-shaped space in cross section, a ring of filling material also of substantially V-shaped cross section adapted to fill said space and large enough to extend at its wider outer portion beyond the space and beyond the periphery of the pipe, and a split clamping ring enveloping the packing ring and having means to draw said split ring tightly about the packing ring, said split ring having numerous substantially V-shaped projections extending from its inner surface and approximately concentric with said ring and V-shaped space, said projections being smaller in cross section than the packing ring and adapted to engage the outer projecting enlarged portion thereof whereby to compress the packing material into the V-shaped space and draw in the material from the sides of the outer portion of the ring, said clamping ring adapted to engage portions of the outer enlarged part of the packing ring and adapted to flatten and compress such portions against the outer periphery of the pipe sections adjacent the V-shaped space.

In witness whereof I have hereunto set my hand.

HARRY CONRADI.

Witness:
GEORGE G. TURRI.